Aug. 16, 1932.   C. C. JONES   1,871,615
AUTOMOBILE MIRROR
Filed Jan. 19, 1931
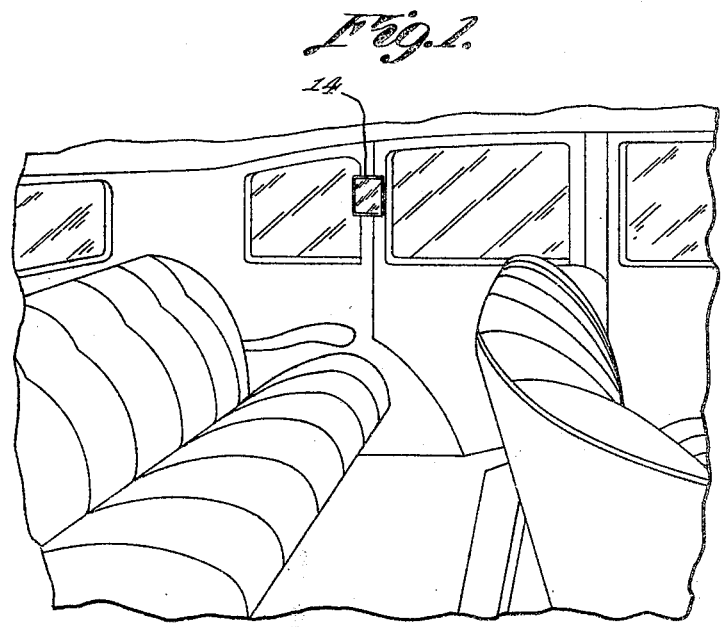
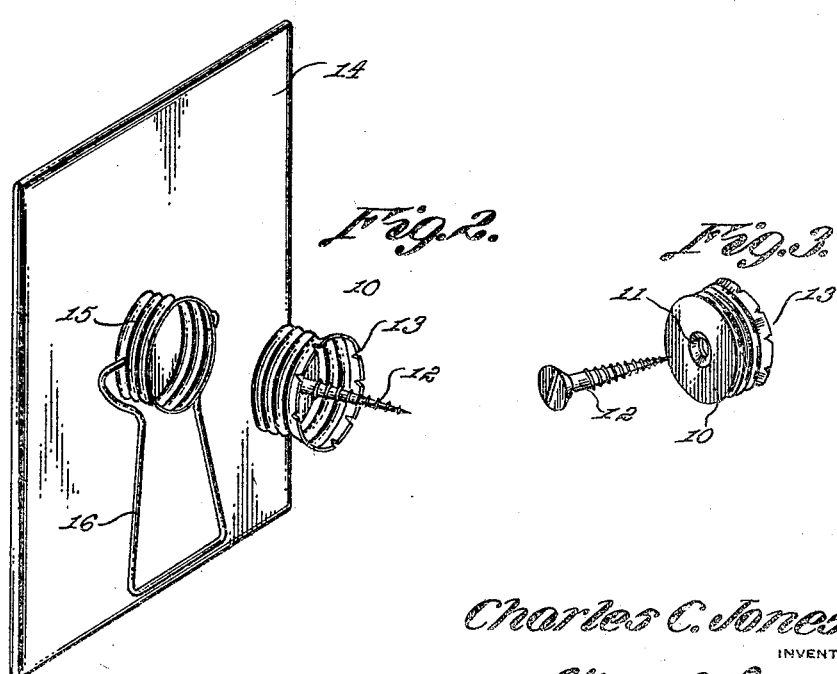

Patented Aug. 16, 1932

1,871,615

UNITED STATES PATENT OFFICE

CHARLES CARTER JONES, OF MERIDIAN, MISSISSIPPI

AUTOMOBILE MIRROR

Application filed January 19, 1931. Serial No. 509,871.

This invention relates to mirrors and like articles and has especial reference to means for attaching a mirror in position for use, the invention being especially adapted for use in automobiles.

An object of the present invention is to provide cheap, novel and efficient means whereby a mirror or other article may be easily attached upon the inside of an automobile with the attaching means concealed, the said attaching means permitting of the ready removal and replacement of the article, so that it may be used either attached or detached.

With the above and other objects in view, the invention further includes the following novel features and details of construction, to be hereinafter more fully described, illustrated in the accompanying drawing and pointed out in the appended claim.

In the drawing:—

Figure 1 is a fragmentary perspective view showing the inside of an automobile with the invention in place.

Figure 2 is a perspective view looking at the rear of the mirror with the attaching means separated.

Figure 3 is a detail perspective view of the externally threaded cup-shaped member and the securing screw.

Referring to the drawing in detail wherein like characters of reference denote corresponding parts, the article attaching device as shown comprises an externally threaded cup-shaped member 10. This member is provided at its closed end with an opening 11 which is surrounded by an inwardly beveled portion so as to receive the beveled head of an attaching screw 12 which is adapted to pass through the opening 11 for the purpose of securing the cup-shaped member in place. By means of the screw 12 or a like element, the cup-shaped member 10 may be attached to the frame upon the inside of the automobile, and to prevent the cup-shaped member from turning while being secured in place, the open end of the cup-shaped member is toothed or serrated as shown at 13.

Suitably attached to the rear of a mirror or other article 14 is an internally threaded cap 15. This cap is adapted to be threaded upon the cup-shaped member 10 so as to hold the article in position. The teeth or serrations 13 also act to prevent rotation of the cup-shaped member 10 while the article 14 is being attached or detached.

If desired, an arm 16 may be suitably attached to the cap 15, or to the back of the mirror or article 14 so that the latter may if desired be placed upon a table or other support.

The invention is susceptible of various changes in its form, proportions and minor details of construction and the right is herein reserved to make such changes as properly fall within the scope of the appended claim.

Having described the invention what is claimed is:—

An automobile mirror support comprising a substantially cylindrical shaped element externally screw-threaded and having one end closed and provided with a centrally arranged aperture and having the edges of its opposite end serrated, a headed screw-threaded fastener extending through the aperture and threaded to a support to force the serrated edge to bite into the support and hold said element against rotation, a second substantially cylindrical shaped element internally screw-threaded and threaded onto the first element and having one end closed, a mirror secured to the closed end of the second element, and a handle secured to opposite sides of the second element to permit supporting of the mirror when said elements are detached.

In testimony whereof I affix my signature.

CHARLES CARTER JONES.